United States Patent
Fenchel et al.

(10) Patent No.: US 8,200,015 B2
(45) Date of Patent: Jun. 12, 2012

(54) METHOD FOR INTERACTIVELY SEGMENTING STRUCTURES IN IMAGE DATA RECORDS AND IMAGE PROCESSING UNIT FOR CARRYING OUT THE METHOD

(75) Inventors: Matthias Fenchel, Erlangen (DE);
Andreas Schilling, Gomaringen (DE);
Stefan Thesen, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 1029 days.

(21) Appl. No.: 12/213,328

(22) Filed: Jun. 18, 2008

(65) Prior Publication Data

US 2008/0317351 A1 Dec. 25, 2008

(30) Foreign Application Priority Data

Jun. 22, 2007 (DE) .......................... 10 2007 028 899

(51) Int. Cl.
*G06K 9/34* (2006.01)

(52) U.S. Cl. .......................... 382/176; 382/132; 382/154
(58) Field of Classification Search .......... 382/128–132, 382/154, 173–176
See application file for complete search history.

(56) References Cited

U.S. PATENT DOCUMENTS

| 5,903,664 | A | 5/1999 | Hartley et al. | |
| 6,078,688 | A * | 6/2000 | Cox et al. | 382/173 |
| 7,043,290 | B2 * | 5/2006 | Young et al. | 600/416 |
| 7,596,267 | B2 * | 9/2009 | Accomazzi et al. | 382/173 |
| 7,692,664 | B2 | 4/2010 | Weiss et al. | |
| 2003/0053667 | A1 * | 3/2003 | Paragios et al. | 382/128 |
| 2004/0008886 | A1 | 1/2004 | Boykov | |
| 2005/0281381 | A1 | 12/2005 | Guendel | |
| 2006/0034511 | A1 | 2/2006 | Verstraelen et al. | |
| 2006/0177133 | A1 * | 8/2006 | Kee | 382/173 |

(Continued)

FOREIGN PATENT DOCUMENTS

DE 19746936 A1 5/1998

(Continued)

OTHER PUBLICATIONS

Barrett, W.A., Mortensen, E.N.; Interactive Live-Wire Boundary Extraction; Medical Image Analysis, vol. 1, No. 4, pp. 331-341. CVPR'99 #107 p. 6/7; Others; 1997.

(Continued)

*Primary Examiner* — Jingge Wu
(74) *Attorney, Agent, or Firm* — Harness, Dickey & Pierce, P.L.C.

(57) ABSTRACT

In the method according to at least one embodiment of the invention, an image data record having a structure to be segmented is first of all displayed by display equipment. Using an input apparatus, a segmentation algorithm to be used is selected from a group of different segmentation algorithms, including a contour-based segmentation algorithm, a region-based segmentation algorithm and manual segmentation, based on the local image contrast in a region to be segmented in the image data record. A region to be segmented in the image data record is marked, and the structure to be segmented in the marked region is segmented using the selected segmentation algorithm, and a segmentation result of the segmentation is displayed. This procedure (selecting a segmentation algorithm/marking a region/segmenting the region/displaying) is repeated until the structure to be segmented is completely segmented in the displayed image data record and a boundary line of the structure is produced as the final segmentation result. Lastly, the final segmentation result is saved and/or displayed. Furthermore, an image processing unit is disclosed for carrying out the method of at least one embodiment.

15 Claims, 3 Drawing Sheets

U.S. PATENT DOCUMENTS

| | | | |
|---|---|---|---|
| 2006/0285747 A1* | 12/2006 | Blake et al. | 382/180 |
| 2007/0165949 A1* | 7/2007 | Sinop et al. | 382/173 |
| 2009/0003699 A1* | 1/2009 | Dugan et al. | 382/173 |
| 2009/0060333 A1* | 3/2009 | Singaraju et al. | 382/173 |
| 2009/0180692 A1* | 7/2009 | Sheasby et al. | 382/173 |
| 2010/0272357 A1 | 10/2010 | Maxwell et al. | |

FOREIGN PATENT DOCUMENTS

| | | |
|---|---|---|
| DE | 102004027710 | 1/2006 |
| DE | 102005029607 A1 | 3/2006 |

OTHER PUBLICATIONS

German Office Action Issued Feb. 14, 2008.

X. Munoz, Jr. Freixenet, X. Cufi, J. Marti: Strategies for Image Segmentation Combining Region and boundary Information in: Pattern Recognition Letters 24 (2003) p. 375-392; Institute of Informatics, University of Girona, Spain.

* cited by examiner

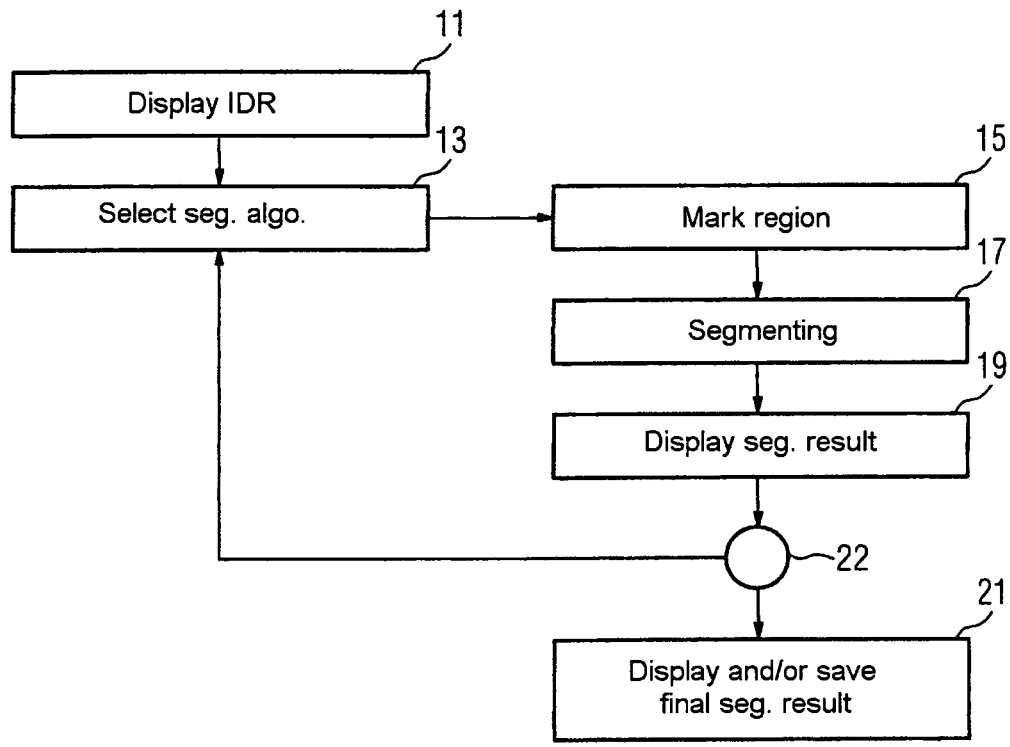
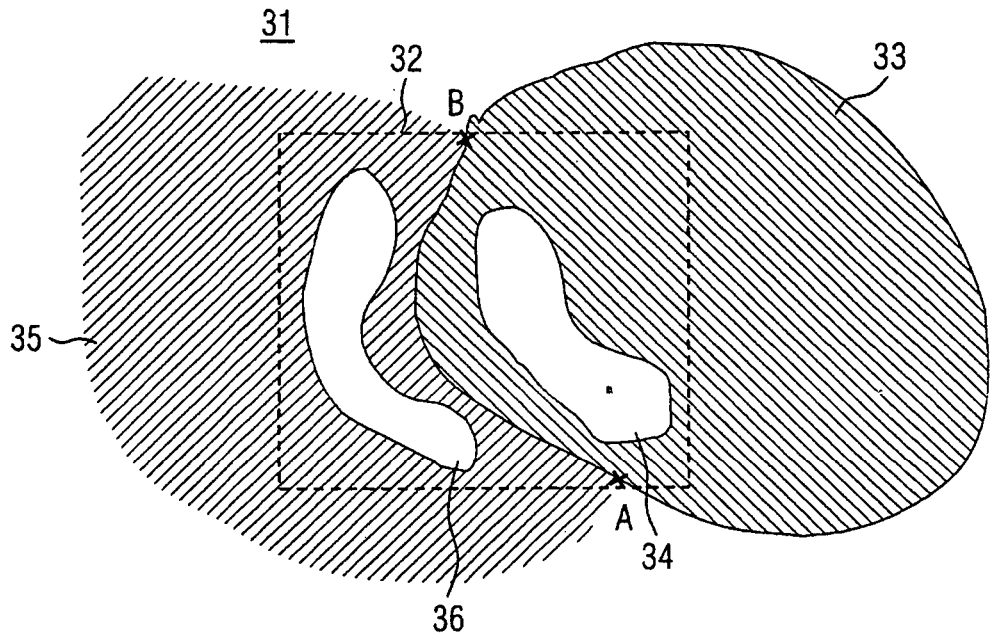

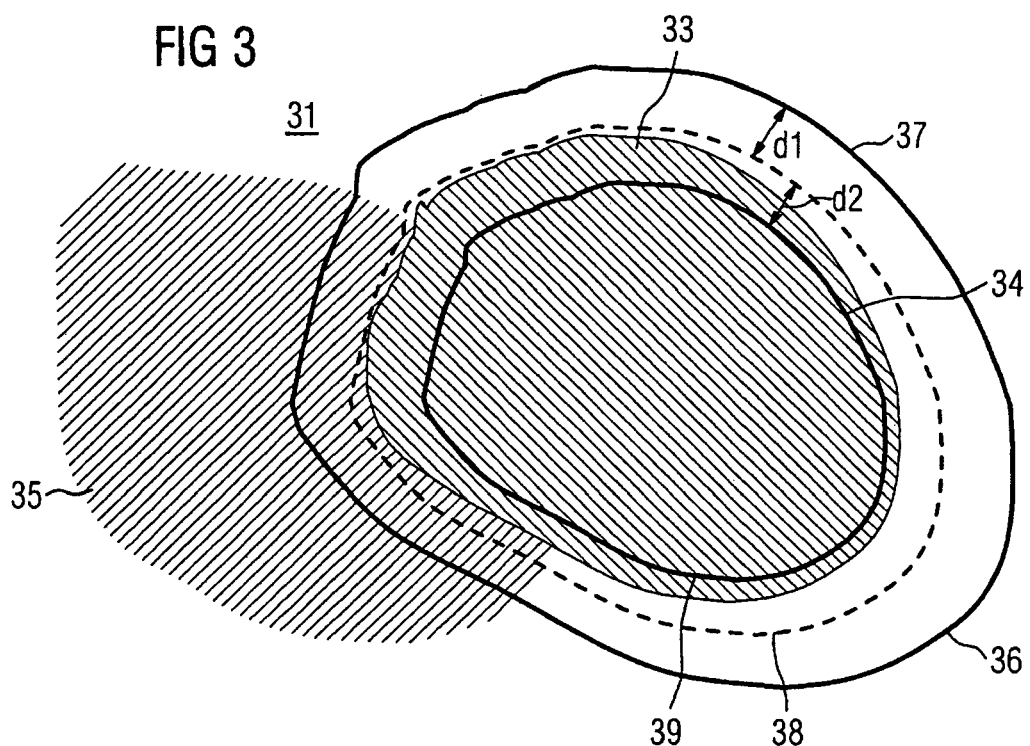
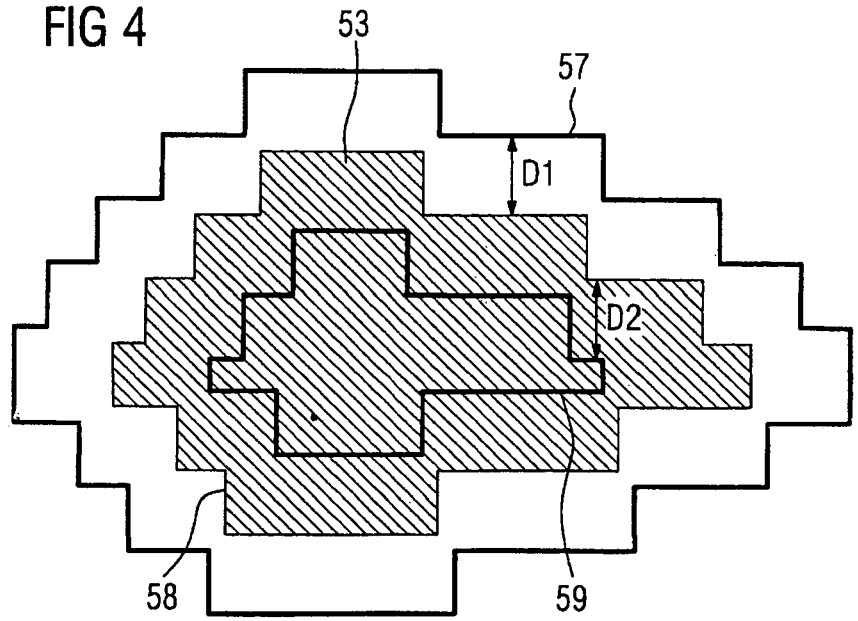

METHOD FOR INTERACTIVELY SEGMENTING STRUCTURES IN IMAGE DATA RECORDS AND IMAGE PROCESSING UNIT FOR CARRYING OUT THE METHOD

PRIORITY STATEMENT

The present application hereby claims priority under 35 U.S.C. §119 on German patent application number DE 10 2007 028 899.0 filed Jun. 22, 2007, the entire contents of which is hereby incorporated herein by reference.

FIELD

Embodiments of the invention generally relate to a method for interactively segmenting structures in image data records and/or to an image processing unit for carrying out the method.

BACKGROUND

Segmenting anatomical structures is an important part of the analysis of image data, in particular of medical image data as well. Important examples are the planning of surgical procedures, volumetric examinations of organs, evaluating the progression of metastases, or the statistical modeling of organs.

In this case, image information about a three-dimensional (3D) structure is usually present as a sequence of two-dimensional (2D) scan slices of an imaging modality, such as, for example, computed tomography (CT) or magnetic resonance imaging (MRI). For this reason, it is conventional that the desired structure must firstly be segmented in the individual scan slices before it can be composed to form a 3D structure. However, segmentation algorithms for directly segmenting 3D structures are already available as well.

A fully automatic segmentation of medical image data is barely possible to implement using current technology. For this reason it is inevitable that a user must be able to independently intervene during the segmentation. Depending on the segmentation algorithm used, the user intervenes in different ways in the segmentation in order to control the result in the desired manner.

Diverse algorithms for interactive segmentation exist. Here, inter alia, two different main groups can be distinguished: contour-based segmentation algorithms and region-based segmentation algorithms.

As an example contour-based segmentation algorithm, the so-called livewire method will be discussed briefly here. This method has become established as a qualitatively high-grade interactive segmentation of organ structures from 3D data records. It is very reliable, particularly in the case of high image contrasts. However, in the case of weak image contrasts an extremely large number of interventions by the user is often required to achieve an acceptable result.

The basic concept of the livewire method is the following: a user marks a starting point on the contour of the structure in a displayed image data record, for example by means of a cursor and a mouse, and then moves the cursor to another position in the image data record. The livewire algorithm calculates the course of the contour from the starting point to the current position of the cursor. For this purpose, a so-called cost function is used which allows a path to be extrapolated which satisfies certain criteria in an optimum manner, such as, for example, minimum change of the value of the gradient along the path. Should the calculated path not lie correctly on the contour of the structure, the user can take corrective action, for example by simply clicking on and displacing the path. More details are described, for example, in W. A. Barret and E. N. Mortensen (1997) "Interactive Livewire Boundary Extraction", Medical Image Analysis, Vol. 1, No. 4, pp. 331341, CVPR '99 #107 page 6/7.

As an example of a region-based segmentation algorithm, the so-called GraphCut method will be discussed briefly here. This method too has become established as qualitatively high-grade and achieves a good result even in the case of weak image contrasts. In the GraphCut method, the user characterizes such image regions which are located within the structure and such image regions which are located outside of the structure. The GraphCut algorithm calculates the maximum discontinuity between these regions, again using a cost function as a criterion which comprises, for example, grayscale information in the characterized regions. This maximum discontinuity corresponds to the border of the structure. If the result is not yet satisfactory after a first segmentation, further inner and outer regions can be marked until an acceptable segmentation result is present. A more detailed description of a GraphCut algorithm and an associated cost function are disclosed in U.S. 2004/0008886 A1, for example.

By way of such segmentation algorithms, the user works through a given 3D image data record slice by slice until the entire structure is segmented. Depending on the segmentation algorithm used and the image contrasts present in each case, the user can often be forced to intervene, which can significantly increase the processing time of a 3D image data record.

Therefore, there is still the need for user-friendly segmentation algorithms which allow rapid segmentation of structures in a manner which is as intuitive as possible and requires little interaction.

SUMMARY

In at least one embodiment of the invention, a method is provided for segmentation which limits the required interaction of a user with the segmentation method to a few intuitive operating steps which allow an effective operation.

In the case of the method according to at least one embodiment of the invention, an image data record having a structure to be segmented is first of all displayed by display equipment. Using an input apparatus, a segmentation algorithm to be used is selected from a group of different segmentation algorithms, comprising a contour-based segmentation algorithm, a region-based segmentation algorithm, and manual segmentation, based on the local image contrast in a region to be segmented in the image data record. A region to be segmented in the image data record is marked and the structure to be segmented in the marked region is segmented using the selected segmentation algorithm and a segmentation result of the segmentation is displayed. This procedure (selecting a segmentation algorithm/marking a region/segmenting the region/displaying) is repeated until the structure to be segmented in the displayed image data record is completely segmented and a boundary line of the structure exists as the final segmentation result of the image data record. Lastly, the final segmentation result is saved and/or displayed.

The method according to at least one embodiment of the invention thus allows a structure to be segmented in a simple manner which can be carried out intuitively and requires only little interaction between a user and the respective segmentation algorithm by choice of a segmentation algorithm which fits the given situation, e.g. a local value of the contrast. Using this, the segmentation can be carried out more quickly while simultaneously guaranteeing high quality.

Advantageously, a cost function of a region-based segmentation algorithm contained in the group of segmentation algorithms comprises a term which takes a statistical distribution of grayscale values in characterized background regions and structure regions into account. By way of example, this is done by using a term which compares the histograms of the characterized regions. This increases the stability of the segmentation. This is desirable in particular in image data records in which the intensity (grayscale) values for the same tissue contain a lot of noise.

In order to segment a 3D data record recorded slice by slice, it is advantageous if a cost function of the used segmentation algorithm includes a term which takes into account local parallelity of a segmentation result of the structure in the current slice to be segmented and the final segmentation result of the already segmented slice, with the already segmented slice neighboring the further slice in the 3D data record. This results in a better consistency of the final segmentation results in the 3D image data record from one slice to the next slice.

To further ease the segmentation of slices in a 3D image data record, the method of at least one embodiment advantageously includes a method called the "ribbon method" in the following description.

In this case, a final segmentation result of an already segmented neighboring slice is projected onto the slice to be segmented and a first band is placed at a first, outwardly pointing distance d1 in the slice to be segmented from the projected final segmentation result of the neighboring slice. Here, this first band characterizes a background region. A second band is placed at a second, inwardly pointing distance d2 in the slice to be segmented from the projected final segmentation result of the neighboring slice. Here, this second band characterizes a structure region. The slice to be segmented is segmented using the region-based segmentation algorithm based on the characterized background region and the characterized structure region. This avoids manual initialization of the region-based segmentation algorithm by the user. The "inwardly" and "outwardly" thus refer to "within" and "outside of" the structure to be segmented.

Here, the thickness/width of the first and/or second band, and also the distance d1 and d2 are predefined. The thickness/width of a band usually corresponds to a value of between 1 and 20 pixels. The distances are selected depending on the situation. The bands are placed automatically be the segmentation program based on the prescribed distances and band widths.

In order to obtain a 3D structure in a 3D image data record, the segmentation results are cut out of the 3D image data record segmented slice-by-slice and are composed.

The two-dimensional surface manifold of the 3D structure composed of the slice-by-slice final segmentation results is advantageously segmented again with the aid of a variant of the "ribbon method", called the "ribbon method 3D" in the following description, in order to correct the surface of the 3D structure and improve its smoothness and consistency.

Here, a first band is placed at a first, outwardly pointing distance D1 from the two-dimensional surface manifold of the composed 3D structure. Here, the first band characterizes a background region. A second band is placed at a second, inwardly pointing distance D2 from the two-dimensional surface manifold of the composed 3D structure. Here, the second band characterizes a structure region. The surface of the 3D structure is segmented using a region-based segmentation algorithm based on the characterized background region and the characterized surface region.

BRIEF DESCRIPTION OF THE DRAWINGS

Further advantages and details of the present invention emerge from the example embodiments described below, which do not limit the invention in any way, and from the drawings, in which FIG. 1 shows a schematic flow chart of the method according to an embodiment of the invention, FIGS. 2 and 3 show possibilities of segmentation using a very simplified example of a structure to be segmented in a 2D image data record, FIG. 4 shows a schematic illustration of a section through a composed 3D structure after complete segmentation of all the relevant slices.

DETAILED DESCRIPTION OF THE EXAMPLE EMBODIMENTS

Figure 5:
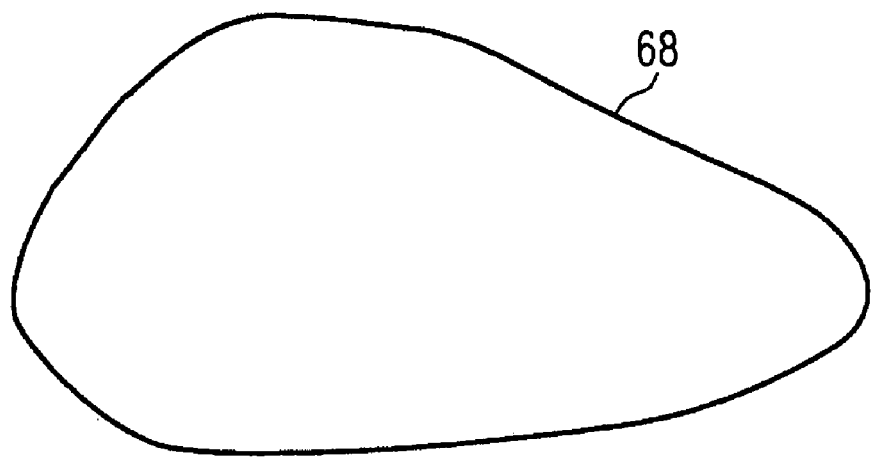
FIG. 5 shows a segmented 3D structure after post-processing.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 schematically shows a flow chart of the method according to an embodiment of the invention. Here, display equipment displays, for example, a 2D image data record (abbreviated to IDR) having a structure to be segmented (block 11). By way of example, the 2D image data record represents one slice of a 3D image data record recorded slice by slice.

A user selects a segmentation algorithm (abbreviated to "seg. algo") to be used based on the local image contrast in a region to be segmented in the image data record (block 13). Here, a choice can be made between a contour-based segmentation algorithm, such as a livewire method; a region-based segmentation algorithm, such as a GraphCut method; or purely manual segmentation, in which the user traces the desired contour by hand, for example.

In a next step, the user marks the region to be segmented in the image data record for which the segmentation algorithm to be used was selected (block 15). If no region is explicitly marked, the entire image data record is treated as the marked region.

Depending on the selected segmentation algorithm, this can be done in different ways. This will be explained in more detail below with reference to FIG. 2.

The segmentation process (block 17) using the selected segmentation algorithm and the display (block 19) of segmentation results (abbreviated to seg. result) can also depend on each other, depending on the selected segmentation algorithm. This will also be explained in more detail below with reference to FIG. 2.

At the query 22, the user determines whether the complete structure to be segmented has been segmented in an acceptable manner or whether regions of the structure have not yet been—or have not been—acceptably segmented. In the first case, the present final segmentation result (abbreviated final seg. result) is, as a last step, displayed and/or saved (block 21); in the latter case, a segmentation algorithm is again selected for segmenting the not yet—or not—acceptably segmented regions and the process is repeated from block 13 to query 22.

In this manner, a region in the image data record can also be segmented using different segmentation algorithms successively until the achieved segmentation result is of adequate quality.

FIG. 2 illustrates a very simplified image data record 31 having a structure 33 to be segmented and a further structure 35.

The structure 33 is represented by the shaded surface with lines running from bottom left to top right. The further structure 35 is represented by the shaded surface with lines running from top left to bottom right. The background is illustrated in white for the sake of clarity. The contrast between the two structures 33 and 35 is only weak. On the other hand, the contrast between the structures 33 or 35 and the background is strong.

The points A and B mark points which are adjoined by both the structure 33 and the further structure 35, and by the background as well.

If the user has selected a region-based segmentation algorithm in order to, for example, segment the structure 33 in that region in which it adjoins the further structure 35, the user marks a rectangular region 32 (white dashed line), as illustrated by way of example, within which the border between the structures 33 and 35 lies. This can be carried out in a usual manner with the aid of an input device, which includes a mouse for example, for example after selecting a rectangular selection tool as the cursor.

In order to initialize the region-based segmentation algorithm, for example a GraphCut algorithm, the user furthermore marks a region 34, within the structure 33 to segmented, as the structure region 34 belonging to the structure 33, and marks a region 36 outside of the structure as a background region 36, with everything which does not count as part of the structure 33 to be segmented being referred to as background in this context. This in turn is carried out with the aid of the input device, wherein other known selection tools can also be available as a cursor.

The initialized region-based segmentation algorithm now segments the structure 33 in the selected region 32 which is bordered by the dashed white lines in the illustration. If the segmentation result in the marked region 32 is not yet satisfactory, the user can characterize further regions as structure regions or background regions until a desired segmentation is present in the region 32. In this example, the solid black line between the structures 33 and 35, which line runs clockwise from point A to point B, is displayed as the segmentation result of this segmentation.

In order to further segment the structure 33 to be segmented, the user now selects a contour-based segmentation algorithm for example, e.g. a livewire algorithm. To mark the region to be segmented, the user simply clicks on a starting point on a contour of the structure 33 to be segmented, e.g. on point B, and moves the cursor further along the structure 33, in this case clockwise, for example.

In this case, a segmentation result from the starting point B to the position of the cursor is always calculated and displayed. During the segmentation using the contour-based segmentation algorithm, the user can mark further points on the desired contour as fixed points for the segmentation algorithm.

The user continues this until an end point, for example point A, is reached. There the user completes the marking of the region to be segmented and, at the same time, the segmentation using the contour-based segmentation algorithm, for example by double-clicking or clicking with another mouse button. The segmentation result of this segmentation is illustrated in this example by the solid black line which runs clockwise from point B to point A.

If the user is not yet satisfied with the respective segmentation results, a segmentation algorithm can be selected anew in order to segment regions again in corrective fashion in which the structure 33 has not yet been segmented satisfactorily. Here the user can fall back on a manual segmentation. Furthermore, in this case, the user can also segment already segmented regions again, possibly with a different segmentation algorithm. Furthermore, already known corrective device(s), such as, for example, the so-called "path cooling" in the case of livewire methods, are also available.

If the user is satisfied with the segmentation results achieved and the structure 33 has been completely segmented in the manner described above, then the segmentation results achieved can be saved as the final segmentation result of the displayed slice.

FIG. 3 clarifies an advantageous method of initializing a region-based segmentation, the so-called "ribbon method", by using the exemplary image data record 31 of FIG. 2 with the structure 33 to be segmented and the further structure 35.

A segmentation result 38 of a neighboring slice is projected onto the image data record 31. A first band 37 is placed at a first, outwardly pointing distance d1 from the projected final segmentation result of the neighboring slice 38. Here, this first band characterizes a background region 34.

A second band 39 is placed at a second, inwardly pointing distance d2 from the projected final segmentation result of the neighboring slice 38. Here, this second band characterizes a structure region 34.

The distances d1 and d2, and also the thickness of the first and of the second band 37 and 39, are appropriately prescribed.

After this automatic initialization of the region-based segmentation algorithm, the user can continue segmenting the structure 33 as described above.

This method significantly eases slice-by-slice segmenting of a structure in a 3D image data record, since a manual initialization has been dispensed with. In this manner, a user can very quickly work through many slices of a multi-slice 3D image data record.

If a structure in a slice disintegrates into a plurality of parts, the individual parts are in each case segmented and can thereupon be unified as a coherent element, for example by means of constructive solid geometry (CSG). Such methods are known as "split" and "merge" methods, for example.

A section through a 3D structure 53 composed of six individually segmented slices is schematically illustrated in FIG. 4 by the hatched surface. The solid black line 58, which delimits the composed 3D structure, is generated by composing the final segmentation results of the individual slices and the edges of the slices. The line 58 thus represents a section through the composed surface and thus the region of the structure 53 selected here.

To exemplify the "ribbon method 3D", the associated section through a first band 57, which is placed at an outwardly pointing distance D1 and characterizes a background region, is also illustrated. Analogously the section also contains a second band 59, which is placed at an inwardly pointing distance D2.

Again, the distances D1 and D2, and also the thickness of the first and of the second band 57 and 59, are appropriately prescribed.

With the aid of a region-based segmentation algorithm, the two-dimensional surface manifold of the composed structure 53 can once again be segmented based on the characterized regions. This segmentation provides the maximum discontinuity between within and outside of in the 3D image data record and thus provides a corrected surface of the 3D structure to be segmented.

FIG. 5 schematically shows the section through the 3D structure of FIG. 4 after segmentation and further sufficiently known post-processing steps, such as, for example, smoothing and anti-aliasing. A smooth surface 68 is obtained.

Figure 6:
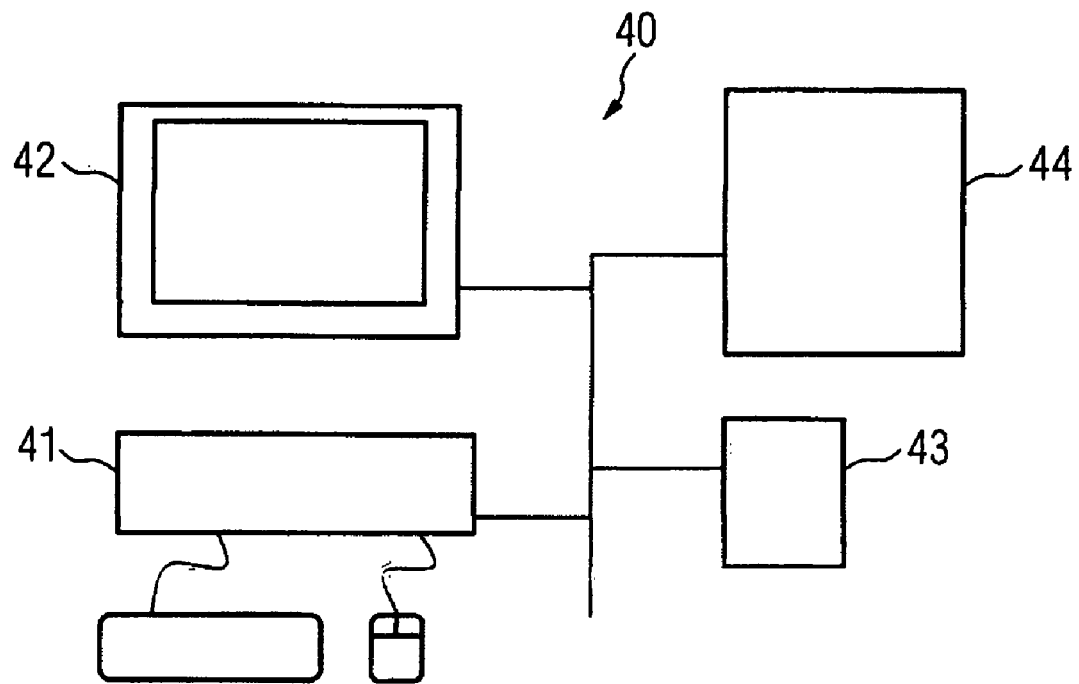
FIG. 6 shows a schematic illustration of a image processing unit for carrying out the method according to an embodiment of the invention.

Finally, FIG. 6 shows a schematic illustration of an image processing unit 40 for carrying out the method according to an embodiment of the invention.

The image processing unit 40 includes an input device 41 for entering commands, for example by means of a mouse or a keyboard, display equipment 42 for displaying image data records, a memory unit 43 for saving and loading image data records and a computational device 44 for carrying out calculations.

A group of segmentation algorithms are implemented on the image processing unit 40.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for interactively segmenting structures in image data records, comprising:
   a) displaying an image data record having a structure to be segmented, wherein the image data record is a two-dimensional (2D) image data record that represents a slice of a three-dimensional (3D) image data record;
   b) selecting a segmentation algorithm to be used, from a group of different segmentation algorithms including a contour-based segmentation algorithm, a region-based segmentation algorithm and manual segmentation, based upon a local image contrast in the region to be segmented in the image data record;
   c) marking a region to be segmented in the image data record;
   d) segmenting the structure in the image data record in the marked region using the selected segmentation algorithm, wherein in order to segment the structure in a further slice of the 3D image data record, a cost function of the selected segmentation algorithm used includes a term that takes local parallelism of a segmentation result of the structure in a current slice of the 3D image data record to be segmented and a final segmentation result of a previously segmented slice of the 3D image data record into account, with the previously segmented slice neighboring the further slice in the 3D image data record;
   e) displaying a segmentation result of the segmentation in the marked region;
   f) repeating steps b) to e) until the structure in the displayed image data record is completely segmented and a boundary line of the structure is available as a final segmentation result of the displayed image data record; and
   g) at least one of saving and displaying the final segmentation result.

2. The method as claimed in claim 1, wherein, in order to segment the structure, a cost function of the used segmentation algorithm is minimized.

3. The method as claimed in claim 2, wherein the cost function of the region-based segmentation algorithm includes a term which takes a distribution of grayscale values in marked background regions and structure regions into account.

4. The method as claimed in claim 1, wherein segmenting a further slice to be segmented comprises:
   projecting a final segmentation result of a previously segmented neighboring slice onto the slice to be segmented,
   automatically characterizing a background region by placing a first band at a first, outwardly pointing distance d1 from the projected final segmentation result of the neighboring slice in the slice to be segmented,
   automatically characterizing a structure region by placing a second band at a second, inwardly pointing distance d2 from the projected final segmentation result of the neighboring slice in the slice to be segmented, and
   segmenting the slice to be segmented using the region-based segmentation algorithm based on the characterized background region and the characterized structure region.

5. The method as claimed in claim 1, wherein the respective final segmentation results are cut from a plurality of neighboring slices of the 3D image data record and are composed to for a 3D structure.

6. The method as claimed in claim 5, wherein further segmentation of a two-dimensional surface manifold of the composed 3D structure by way of the region-based segmentation algorithm comprises:
   automatically characterizing a background region by placing a first band at a first, outwardly pointing distance D1 from the two-dimensional surface manifold of the composed 3D structure,
   automatically characterizing a structure region by placing a second band at a second, inwardly pointing distance D2 from the two-dimensional surface manifold of the composed 3D structure, and
   segmenting the surface of the 3D structure based on the characterized background region and characterized structure region.

7. An image processing unit, comprising:
   an input device for entering commands;
   display equipment for displaying image data records;
   a memory unit for saving and loading image data records; and
   a computational device, to carry out a method as claimed in claim 1.

8. The method as claimed in claim 2, wherein the image data record is a two dimensional image data record representing a slice of a three dimensional image data record, and wherein segmenting a further slice of the 3D image data record to be segmented comprises:
   projecting a final segmentation result of a previously segmented neighboring slice onto the slice to be segmented,
   automatically characterizing a background region by placing a first band at a first, outwardly pointing distance d1 from the projected final segmentation result of the neighboring slice in the slice to be segmented,
   automatically characterizing a structure region by placing a second band at a second, inwardly pointing distance d2 from the projected final segmentation result of the neighboring slice in the slice to be segmented, and
   segmenting the slice to be segmented using the region-based segmentation algorithm based on the characterized background region and the characterized structure region.

9. The method as claimed in claim 2, wherein respective final segmentation results are cut from a plurality of neighboring slices of a 3D image data record and are composed to for a 3D structure.

10. The method as claimed in claim 3, wherein the image data record is a two dimensional image data record representing a slice of a three dimensional image data record, and wherein, in order to segment the structure in a further slice of the 3D image data record, a cost function of the segmentation algorithm used includes a term that takes local parallelism of a segmentation result of the structure in the current slice to be segmented and the final segmentation result of the previously segmented slice into account, with the previously segmented slice neighboring the further slice in the 3D data record.

11. The method as claimed in claim 3, wherein the image data record is a two dimensional image data record representing a slice of a three dimensional image data record, and wherein segmenting a further slice of the 3D image data record to be segmented comprises:
- projecting a final segmentation result of a previously segmented neighboring slice onto the slice to be segmented,
- automatically characterizing a background region by placing a first band at a first, outwardly pointing distance d1 from the projected final segmentation result of the neighboring slice in the slice to be segmented,
- automatically characterizing a structure region by placing a second band at a second, inwardly pointing distance d2 from the projected final segmentation result of the neighboring slice in the slice to be segmented, and
- segmenting the slice to be segmented using the region-based segmentation algorithm based on the characterized background region and the characterized structure region.

12. The method as claimed in claim 3, wherein respective final segmentation results are cut from a plurality of neighboring slices of a 3D image data record and are composed to for a 3D structure.

13. The method as claimed in claim 1, wherein the respective final segmentation results are cut from a plurality of neighboring slices of the 3D image data record and are composed to for a 3D structure.

14. The method as claimed in claim 4, wherein the respective final segmentation results are cut from a plurality of neighboring slices of the 3D image data record and are composed to for a 3D structure.

15. A computer readable medium including program segments for, when executed on a computer device, causing the computer device to implement the method of claim 1.

* * * * *